United States Patent Office 3,006,897
Patented Oct. 31, 1961

3,006,897
DIISOCYANATE-MODIFIED ACID-TREATED POLYESTERS
John A. Parker, Lancaster Township, Lancaster County, Pa., assignor to Armstrong Cork Company, Lancaster, Pa., a corporation of Pennsylvania
No Drawing. Filed Nov. 7, 1958, Ser. No. 772,408
7 Claims. (Cl. 260—75)

This invention relates generally to organic diisocyanate-modified polymers, and more particularly to organic diisocyanate-modified polyesters. Still more particularly the invention relates to the method, and the resulting product, of producing diisocyanate-modified polyesters in the form of gels having real, three-dimensional networks.

It is known to react polyesters with organic aromatic diisocyanates. In the absence of water or other specific polyfunctional cross-linking agents such polyalkylol alkanes, polyamines, amino alcohols and the like, no insoluble, three-dimensional polymers are obtained. Furthermore such would not be expected since one is merely increasing the chain length of the polyester molecules. Some of these products are opaque, jelly-like polymers. However, treatment of these semi-solids with chloroform dissolves the gels completely into soluble polyester urethanes and insoluble complex urea-isocyanates; these products are merely mechanical gels and not real gels having real, three-dimensional networks.

It is the primary object of the present invention to present a process whereby true gels having a real, three-dimensional network may always be produced from polyesters having certain definite chemical properties.

The invention contemplates as a starting material a polyester prepared from at least one dicarboxylic acid and at least one polyol. The polyester resulting from the reaction of these ingredients must have an acid number in the range of 0–10, a hydroxyl number in the range of 20–100, and a number average molecular weight in the range of 2000–4500. This unmodified polyester is treated with an alpha-beta ethylenically unsaturated compound having 4–5 carbon atoms selected from the group consisting of dicarboxylic acids and the anhydrides thereof in an amount of 0.03–0.5 moles of said compound per mole of the unmodified polyester. The treatment must be such as to produce an acid-modified polyester containing the above-described alpha-beta ethylenically unsaturated compound. The resulting polyester is then treated at a temperature in the range of 80°–150° C. with an organic aromatic diisocyanate in an amount of 0.6–1 equivalents per equivalent of the acid-modified polyester. The precise amount of organic aromatic diisocyanate used will be at least sufficient to form a gel having a real, three-dimensional network.

The polyesters of the present invention are formed from two classes of reactants of which one class is exemplified by the dicarboxylic acids. Any organic dicarboxylic acids may be used, preferably those whose carboxyl groups are attached to terminal carbon atoms including succinic, glutaric, adipic, pimelic, suberic, azelaic, sebacic, malonic, brassylic, tartaric, maleic, malic, fumaric, dilinoleic, phthalic, isophthalic, terephthalic, tetrahydrophthalic, and others. The anhydrides corresponding to the acids may be used. Mixtures of these dicarboxylic acids may be used, and in many cases it will be desirable to use a mixture of saturated and unsaturated dicarboxylic acids wherein the unsaturated acid contains one or more ethylenically unsaturated bonds. Use of these unsaturated acids introduces a site into the polyester which, at a subsequent time, may be used to cure the polyester by reaction with curing systems as sulfur-containing curing systems, with or without accelerators, or organic peroxide curing systems.

The other class of reactants from which the polyester is made is the organic polyols, particularly the diols known as glycols. Exemplary of these glycols are ethylene, the propylenes, the butylenes, the tentamethylenes, the hexamethylenes, and the polyalkylene glycols containing recurrent ether linkages but terminated on each end with a hydroxyl group.

The selected dicarboxylic acids and the polyols are mixed and reacted in known manner to form the unmodified polyester useful in the present invention. Stoichiometric amounts of the dicarboxylic acid and the polyols are used, although frequently an excess of the polyol over the dicarboxylic acid is preferred to drive the reaction further toward completion. The dicarboxylic acid and the polyol, for example a glycol, or mixtures of acids and glycols, are heated in known manner to a temperature which may be as high as 300° C. Heating is generally carried out gradually under a vacuum or while having an inert gas bubble through the reacting mixture, or both. Water of condensation is thus swept out of the reaction system and is removed from it.

The polyester reaction is complete when the acid member of the polyester is in the range of 0–10, the hydroxy number is in the range of 20–100, and the number average molecular weight of the polyester is in the range of 2000–4500. These conditons are all critical since if one or more of them is not met, it is impossible to subsequently form an organic diisocyanate-modified polyester having a real, three-dimensional network. If the acid number of the polyester is too large—higher than about 10—a gel cannot subsequently be formed since the terminating acid group on the polyester chain must be of a particular kind in order to function as the trifunctional branching center so essential to produce a three-dimensional network. If the hydroxy number is too small—lower than about 20—insufficient acid groups of the proper nature can be subsequently introduced. If the hydroxyl number is too large—above about 100—competing reactions during the diisocyanate addition eliminate the possibility of true gel formation. If the number average molecular weight of the polyester is outside of the defined range, no true gel will form. Hence the limits of acid number, hydroxyl number, and number average molecular weight of the unmodified polyester are critical to achieve the results intended.

The unmodified polyester prepared as described above and meeting the several critical limitations, is then treated to introduce at one or both ends of the polyester chain the proper carboxylic acid termination; the low acid number of the polyester insures hydroxyl group termination primarily. This is accomplished by treating the unmodified polyester with an alpha-beta ethylenically unsaturated dicarboxylic acid or anhydride having 4–5 carbon atoms. The list of compounds covered by this definition is rather restrictive and consists of maleic acid and anhydride, fumaric acid, citraconic acid and anhydride, and itaconic acid and anhydride. The completely unexpected and unobvious discovery behind the present invention is that only the defined alpha-beta unsaturated acids can supply the needed acid termination to polyester chains which will allow the production of true gels having real, three-dimensional networks on the subsequent addition of the proper amount of organic aromatic diisocyanate in the absence of the cross-linking agents mentioned earlier. The defined alpha-beta unsaturated dicarboxylic acids and anhydrides are added to the polyester in an amount of 0.03–0.5 moles of the alpha-beta unsaturated acid per mole of the unmodified polyester described earlier. These acids react at room temperature or under conditions of mild heating with the hydroxyl groups which terminate the unmodified polyester chains. It is preferred that the anhydrides be used rather than the acid, since use of the anhydride eliminates the possibility of the release of water into the reaction mass when the anhydride reacts with the hydroxyl groups which terminate the unmodified polyester chains. This reaction is not a polymerizing esterification reaction; no true chain extension is involved. One acid group of the dicarboxylic acid or anhydride reacts with a hydroxyl group of the polyester, while the other acid group remains unreacted and in condition to react with the diisocyanate to be subsequently added. Thus the temperature of the reaction mixture should not be above about 115° C., and will generally run 20°–115° C., with 100° C. being the preferred elevated temperature.

The amount of the alpha-beta unsaturated acid or anhydride must be at least 0.03 moles per mole of polyester if the effect is to be noticeable. On the other hand if the amount of the alpha-beta unsaturated acid or anhydride is greater than 0.5 moles per mole of polyester, unreacted acid will be left in the mix which serves to consume the organic diisocyanate to be added subsequently, the reaction products of which produce no benefits. A frequently used range of amounts is 0.2–0.3 moles per mole of polyester.

The entire procedure thus far can be summed up by saying that the steps of the present invention involve the formation of a defined polyester by known procedures, and the touching-up of that polyester with a particular and narrowly defined class of organic dicarboxylic acids or anhydrides thereof to form an acid-modified polyester. The acid-modified polyester is then ready for treatment with the organic aromatic diisocyanate.

The first phase of this portion of the procedure involves the determination of the precise amount of organic diisocyanate to be added to the acid-modified polyester to form the gelled modified polyester. The simplest method of determining the precise amount of organic diisocyanate to be used is an empirical one. A series of samples of the acid-modified polyester is withdrawn and placed in small sample bottles, the samples all being of the same weight. To each sample there is added an increasing amount of the organic diisocyanate, and the resulting mixture is heated as described later. One or more of the samples will gel, while the sample having the next lower amount of diisocyanate will remain fluid. Thus the weight of the organic diisocyanate to be added to any given weight of the acid-modified polyester may readily be determined. This method is not as tedious as it might sound. Using the acid-modified polyester prepared as described earlier, the gel point will always occur when the organic diisocyanate is added in an amount in the range of about 0.6–1 equivalents of the diisocyanate per equivalent of the acid-modified polyester. This means that four or five samples will be enough, since to each sample will be added respectively that weight of organic diisocyanate which corresponds to 0.6, 0.7, 0.8, and 0.9 equivalents of diisocyanate per acid-modified polyester equivalent. The following relationship is useful in determining just that amount of organic diisocyanate to be added to any given acid-modified polyester to produce an incipient gel:

$$r_{(critical)} = \frac{[NCO]}{[HO + COOH]}$$

In the above formula, $r_{(critical)}$ is the ratio of organic diisocyanate equivalents to acid-modified polyester equivalents and will always be in the range of 0.6–1. The term [NCO] is the equivalent weight of the organic diisocyanate; in this reaction the equivalent weight of the organic diisocyanate is one-half the molecular weight. The term OH is the hydroxyl number of the acid-modified polyester, and the term COOH is the acid number of the acid-modified polyester. Knowing that $r_{(critical)}$ must always be in the range of 0.6–1 to achieve an incipient gel having a real, three-dimensional network, the amount of organic diisocyanate to be used in each of the samples is readily obtained.

Knowledge of the chemistry of these reactions allows use of an alternate and rather elegant method for determining the amount of dicarboxylic acid or anhydride to be added in conjunction with the amount of the organic aromatic diisocyanate. This alternate method allows the mere selection of the $r_{(critical)}$ value between the 0.6–1 limits described earlier. Thus one can pick any of the polyesters contemplated for use in the present invention, and select an $r_{(critical)}$ value guided by the considerations to be given below. Having the polyester, and having selected the desired $r_{(critical)}$ value, the amount, $W_a$, of the dicarboxylic acid or anhydride to be added, and the amount, $W_i$, of the aromatic organic diisocyanate to be added, may be readily calculated by the following two equations:

(1) $$W_a = \frac{W_p H_o E_a (1 - r_{(crit)})}{4 r_{(crit)} k}$$

(2) $$W_i = \frac{r_{(crit)} E_i W_p H_o}{k}$$

In the above two equations the following notations apply:

$W_p$ = the weight of polyester to be treated.
$H_o$ = the hydroxyl number of the initial polyester.
$E_a$ = the equivalent weight of the modifying dicarboxylic acid or anhydride, here equal to the molecular weight.
$r_{(crit)}$ = the selected value.
$E_i$ = the equivalent weight of the organic aromatic diisocyanate, here equal to one-half the molecular weight.
$k$ = the milliequivalent of potassium hydroxide, namely, $5.61 \times 10^4$.

In selecting the $r_{(crit)}$ value within the limits earlier defined, the higher the hydroxyl number of the polyester and the selected $r_{(crit)}$ value, the greater will be the amount of diisocyanate to be added and the greater will be the gel content of the final product. This merely means that the higher the hydroxyl number and $r_{(crit)}$ value, the stiffer will be the resulting product. The smaller the selected $r_{(crit)}$ value, the greater will be the ratio of hydroxyl number:acid number of the acid-modified polyester. The smaller this ratio, the easier it is to weigh out the precise amount of diisocyanate needed to form the incipient gel. The larger this ratio, the more difficult it is to accomplish the accuracy of weighing needed to add the exact amount of diisocyanate needed to accomplish incipient gelation, no more, no less. Also, the higher the ratio, the higher the gel content; the lower the ratio, the lower the gel content.

It must be emphasized that the point of incipient gelation—that point defined by the $r_{(crit)}$ value —is an easily recognized end point. As one adds the aromatic diisocyanate in amounts less than that defined by the $r_{(crit)}$ value, no change in the fluidity or other physical properties of the acid-modified polyester can be detected. Even an amount of the diisocyanate of, say, 0.1% by weight less than that required to achieve incipient gelation, leaves the acid-modified polyester in a liquid or fluid state. However, once the exact amount of diisocyanate defined by the $r_{(crit)}$ value has been added, dramatic changes occur. The fluid acid-modified polyester immediately stiffens and ceases its flow at room temperature. This extraordinarily noticeable change occurs even in those acid-modified polyesters in which the $r_{(crit)}$ value is such to produce a gel content on the order of only about 5% by weight of the total composition; very small gel contents nevertheless suffice to produce easily observable points of incipient gelation.

Once the point of incipient gelation—defined by the $r_{(crit)}$ value—has been reached, it is possible to continue adding aromatic organic diisocyanate up to the point where the $r$ value—not the $r_{(crit)}$ value—equals 1. The $r$ value is the ratio of diisocyanate equivalents to acid-modified polyester equivalents. As the additional diisocyanate is added, additional cross-links are established and the gel content in the composition grows ever larger. As a result the gel grows stiffer and stiffer. At the same time the product is completely stable since there are no unreacted isocyanate groups present in the molecule; all of them have participated in the cross-linking reaction. However, once the amount of diisocyanate reaches an $r$ value of 1, unreacted isocyanate groups are present and the polymer is therefore unstable. The present invention is not concerned with these unstable polymers.

Summarizing, the present invention allows the predictable production of polyurethanes. In one embodiment, a defined polyester is reacted with defined amounts of defined dicarboxylic acids or anhydrides, followed by the empirical determination of the amount of organic aromatic diisocyanate needed to produce incipient gelation. If desired, additional diisocyanate may be added up to a defined limit to produce tougher and stiffer products. In another embodiment of the invention, a defined polyester is characterized by assigning to it an $r_{(crit)}$ value, followed by the determination of the amount of the dicarboxylic acids or anhydrides to be added, along with a determination of the amount of the organic aromatic diisocyanate to be subsequently added. In both cases the invention contemplates the touching up of a defined polyester with defined carboxylic acids or anhydrides, followed by reaction of the resulting product with the proper amount of an organic aromatic diisocyanate.

The proper amount of the organic diisocyanate is thoroughly admixed with the acid-modified polyester. Completion of the reaction is then carried out by heating the mixture to a temperature in the range of about 80°–150° C. until gelation is complete. Longer times will be required at lower temperatures, and the time will generally run from about two hours to about 20 hours. The final product at the elevated temperature will be thick and viscous in contrast to its fluid nature prior to the reaction with the organic diisocyanate. The heating may be carried out in any convenient manner. The mixture of acid-modified polyester and diisocyanate may be placed in suitable containers and then heated in the containers in an oven. Frequently it is desirable to mix the diisocyanate and the acid-modified polyester in a mixing device capable of being heated, such as a Baker-Perkins mixer. The reaction between the diisocyanate and the polyester may be carried out in part in such a mixer whereupon the mixture may be discharged into suitable containers which are than placed in an oven for completion of the cure.

The final product obtained on cooling will be found to be a hard, tough elastomer which is a gel having a real, three-dimensional network. In the present specification and claims where the phrase "real, three-dimensional network" is used, it is intended to define the situation where the acid-modified polyester has been chain-extended to a maximum and at the same time cross-linking has occurred to produce the true gel.

The present invention results in part from the surprising and completely unexpected discovery that only the defined alpha-beta unsaturated dicarboxylic acids and anhydrides thereof in the amounts used will produce a diisocyanate-modified polyester which is a true gel. If acid groups other than those defined herein are used to terminate the polyester, then those acid groups react only slightly, if at all, up to $r$ values in excess of one. On the other hand where the terminating acid groups are those defined herein, the acid groups are consumed directly by each incremental addition of the organic diisocyanate. The organic aromatic diisocyanate takes part in a series of competing reactions when added to polyesters. Thus the diisocyanate will react with hydroxyl groups and with any carboxylic acid groups. However, when the particular alpha-beta unsaturated acid groups defined earlier are used to terminate the polyester chain, the diisocyanate preferentially reacts with these groups and substantially not at all with any others. The defined alpha-beta unsaturated acid groups are the only groups in these types of polyesters which can function as trifunctional branching centers and thus yield a real, three-dimensional network.

The invention is not critical as to the precise organic aromatic diisocyanate to be used. The preferred diisocyanate at this time is 2,4-toluene diisocyanate, but this is primarily based on cost. Additional diisocyanates which may be used are 4,4'-diphenyl diisocyanate; 4,4'-diphenylene methane diisocyanate; dianisidene diisocyanate; 4,4'-tolidene diisocyanate; the various naphthalene diisocyanates; and p-phenylene diisocyanate. Choice of the particular polyester, and the particular diisocyanate will produce true gels according to the present invention which will have different properties among themselves. Hence it is possible to make a choice among a wide variety of tough elastomers depending on the particular use to which the end product is to be put. Many of the diisocyanate-modified polyesters of the present invention are useful in modifying the properties of vinyl chloride resins such as polyvinyl chloride and vinyl chloride-vinyl acetate copolymers. The diisocyanate-modified polyesters may be admixed with conventional plasticizers with the vinyl chloride resins and may then be used to form films which are tough, strong, and stable and which are suitable for forming the top surface of such surface covering materials as wall coverings, floor coverings, desk tops, counter tops, and the like. The films may be colored with suitable pigments and dyes to present an attractive appearance to the eye. The films may be embossed and colored to simulate leather which can then be used as a covering for articles of furniture such as chairs, sofas, and the like. The vinyl chloride resin-modified polyester mixture may also be utilized as a binder in the formation of plastic floor and wall coverings wherein conventional fillers and coloring materials are incorporated into the mixture. The final mixture may be calendered or otherwise deposited onto a suitable backing such as felt sheets, asbestos sheets, burlap, or the like in order to form tough, strong floor and wall coverings.

The following examples illustrate several embodiments of the invention. It should be particularly noted in the following examples that the ingredients which go to make up the unmodified polyester are not at all critical so long as certain minimum requirements are met. All parts are by weight unless otherwise stated.

*Example 1*

Into a suitable reactor equipped with a reflux condenser, a take-off condenser, a gas inlet tube, and a stirrer, was placed 1944 parts (21.6 moles, 20% mole excess) 1,4-butanediol and 2628 parts (18 moles) adipic acid. The mixture of ingredients was brought up to 200° C. under reflux over a period of four hours using carbon dioxide gas through the gas inlet tube. The temperature was maintained at 200° C. for 15 hours and then was increased to 230° C. The take-off condenser was then used, and the temperature was maintained at 230° C. until an acid number of four plus or minus two was obtained. On cooling, the polyester 1,4-butylene adipate was found to have a final hydroxyl number of 58.5 and a final acid number of 2.6.

It was decided to prepare diisocyanate-modified 1,4-butylene adipate containing about 40% by weight gel so that the gel would be suitable as a plasticizer for polyvinyl chloride by processing the modified polyester and the polyvinyl chloride on a mill. Accordingly an $r_{(crit)}$ value of 0.6 diisocyanate equivalents per polyester equivalents was chosen. This $r_{(crit)}$ value called for the addition of 17.1 grams of maleic anhydride as calculated by Equation 1. Accordingly, 17.1 grams of maleic anhydride was added to 1000 parts of the above-described polyester and the mixture was stirred and warmed to a temperature of 85° C. and maintained at that temperature for 15 minutes. The amount of 2,4-toluene diisocyanate needed to produce incipient gelation was determined to be 54.6 parts by Equation 2. Accordingly, this amount of toluene diisocyanate was added to the maleic anhydride-modified polyester, thoroughly mixed in, and the mass was maintained at a temperature of 125° C. for 15 hours.

The cooled gel in an amount of 30 parts was admixed with 100 parts polyvinyl chloride on a mill at about 120° C. and the mixed product was sheeted off. The resulting sheet was clear, tough, and strong.

To convert a portion of the processable diisocyanate-modified 1,4-butylene adipate into a much tougher stock containing about 66% gel, it was calculated that the ratio, $r$, of diisocyanate equivalents to polyester equivalents should be about 0.78. Accordingly, to 500 parts of the diisocyanate-modified polyester prepared as described above there was added an additional 2.7 parts 2,4-toluene diisocyanate at a temperature of 125° C. with thorough mixing, and the stock was maintained at 125° C. for 15 hours before cooling. The resulting hard gum could be mixed in an internal mixer with polyvinyl chloride to form a composition preeminently suitable as the binder system in a homogeneous vinyl tile.

It should be pointed out in this example that the initial $r_{(crit)}$ value selected was 0.6. Any $r_{(crit)}$ value between 0.6 and 1.00 could have been chosen. The result of increasing the selected $r_{(crit)}$ value between 0.6 and 1.00 is a decreased amount of the maleic anhydride to be added and an increased amount of diisocyanate to be added with the result that the diisocyanate-modified polyester, with increasing $r_{(crit)}$ values posseses an increasing gel content and thus becomes increasingly stiff. Thus one is able to choose the stiffness of the desired gel.

*Example 2*

The polyester 1,3-butylene azelate was prepared as in Example 1 by placing in the reactor 1491 parts (16.6 moles) 1,3-butanediol, and 2632 parts (14 moles) azelaic acid. The mixture was heated to 200° C. over a period of four hours, and the temperature was maintained at 200° C. for nine hours. The carbon dioxide gas flow was maintained as usual. At the end of nine hours the temperature was increased to 220° C. and the distillate was removed. These conditions were maintained until an acid number of four plus or minus two was obtained. On cooling, the final acid number was found to be 1.8 and the final hydroxyl number was 36.0.

An $r_{(crit)}$ value of 0.7 was arbitrarily chosen. To 1000 parts of the polyester was added 7.7 parts citraconic acid with stirring and the mixture was maintained at 100° C. under vacuum for one hour. Incipient gelation was produced by the addition of 35.8 parts 2,4-toluene diisocyanate with stirring, followed by maintaining the mixture at 100° C. for 16 hours. The resulting gel was an excellent plasticizer both for polyvinyl chloride and for vinyl chloride-vinyl acetate copolymers containing up to 13% by weight vinyl acetate.

*Example 3*

The polyester 1,3-butylene sebacate was prepared as in Example 1 by the usual heating procedure carried out on 1035 parts (11.5 moles) 1,3-butanediol and 2020 parts (10 moles) sebacic acid.

The final polyester possessed a hydroxyl number of 34.1 and an acid number of 3.

An arbitrary $r_{(crit)}$ value of 0.8 was chosen and accordingly 3.74 parts maleic anhydride was added to 1000 parts of the polyester and the mixture was warmed to open the anhydride ring and react one end of the anhydride with a terminating hydroxyl group of the polyester.

To the maleic anhydride-modified polyester was added 42.5 parts 2,4-toluene diisocyanate and the mixture was maintained at 100° C. for 15 hours. The resulting gel was easily processable as a plasticizer for polyvinyl chloride.

*Example 4*

A reaction mixture made up of 724.5 parts (8.05 moles) 1,3-butanediol, 724.5 parts (8.05 moles) 1,4-butanediol, and 2632 parts (14 moles) azelaic acid was treated as usual to make a polyester having a final hydroxyl number of 39.5 and an acid number of 2.1. To achieve an $r_{(crit)}$ value of 0.75 there was added to 1000 parts of the polyester 5.75 parts maleic anhydride and, after the usual mild heating, 46.0 parts 2,4-toluene diisocyanate. After the diisocyanate reaction carried out for 16 hours at 125° C., the resulting diisocyanate-modified polyester served as an excellent and easily processable plasticizer for polyvinyl chloride.

*Example 5*

Into the reactor was placed 1138.5 parts (12.65 moles) 1,3-butanediol, 1460 parts (10 moles) adipic acid, and 320.6 parts (2 moles) dilinoleic acid (Empol 1022). The mixture was subjected to the usual heating cycle and on cooling was found to possess a final hydroxyl number of 37.8 and a final acid number of 4.2. An $r_{(crit)}$ value of 0.9 was selected and accordingly 1.83 parts maleic anhydride was added, followed by the usual warming. A total of 52.8 parts 2,4-toluene diisocyanate was needed to produce incipient gelation after 15 hours' heating at 125° C.

A mixture of polyvinyl chloride containing approximately 30% by weight of the above-described diisocyanate-modified polyester was milled on a cold mill. A sulfur-containing curing system was added to the mixture and the diisocyanate-modified polyester plasticizer in the polyvinyl chloride composition was cured by maintaining the composition at 200° F. for two weeks. A strong and tough sheet resulted.

I claim:

1. In the method of making an organic diisocyanate-modified polyester wherein an unmodified polyester prepared from at least one dicarboxylic acid and at least one glycol is reacted with an organic diisocyanate, said unmodified polyester having an acid number in the range of 0–10, a hydroxyl number in the range of 20–100, and a number average molecular weight in the range of 2000–4500, the improved method of making a gelled product having a real, three-dimensional network which comprises adding to said unmodified polyester an alpha-beta ethylenically unsaturated compound having 4–5 carbon atoms selected from the group consisting of maleic acid, fumaric acid, citraconic acid, itaconic acid, and anhydrides thereof in an amount of 0.03–0.5 moles of said compound per mole of said unmodified polyester, maintaining the mixture of said compound and said unmodified polyester at a temperature in the range of 20°–115° C. to cause a carboxyl group on said compound to react with a hydroxyl group on said polyester and form a carboxylic-acid-terminated polyester, and subsequently adding to the acid-modified polyester at a temperature in the range of 80°–150° C. an organic aromatic diisocyanate in an amount of 0.6–1 equivalents per equivalent of said acid-terminated polyester at least sufficient to form a gel having a real, three-dimensional network.

2. A method according to claim 1 wherein said ethylenically unsaturated compound comprises maleic anhydride.

3. The method according to claim 1 wherein said ethylenically unsaturated compound is used in an amount of about 0.2–0.3 moles per mole of said polyester.

4. The method according to claim 1 wherein said ethylenically unsaturated compound comprises an anhydride.

5. The method according to claim 1 wherein said organic aromatic diisocyanate is added in an amount just sufficient to produce incipient gelation.

6. The method according to claim 1 wherein said organic aromatic diisocyanate is added in an amount in excess of that required to produce incipient gelation.

7. The product of the method of claim 1.

References Cited in the file of this patent

UNITED STATES PATENTS

| | | |
|---|---|---|
| 2,740,743 | Pace | Apr. 3, 1956 |
| 2,760,953 | Seeger | Aug. 28, 1956 |
| 2,868,739 | Nischk et al. | Jan. 13, 1959 |